Feb. 10, 1970 L. B. SMITH ET AL 3,495,182

TEMPERATURE COMPENSATED TRANSISTOR AMPLIFIERS

Filed Jan. 17, 1964

INVENTOR.
LELAND B. SMITH
BARRET B. WEEKES
BY FOWLER, KNOBBE & GAMBRELL
ATTORNEYS

United States Patent Office 3,495,182
Patented Feb. 10, 1970

3,495,182
TEMPERATURE COMPENSATED TRANSISTOR AMPLIFIERS

Leland B. Smith, Fullerton, and Barret B. Weekes, Newport Beach, Calif., assignors to Beckman Instruments, Inc., a corporation of California
Filed Jan. 17, 1964, Ser. No. 338,362
Int. Cl. H03f *1/32, 3/04*
U.S. Cl. 330—23 4 Claims

ABSTRACT OF THE DISCLOSURE

Two embodiments of temperature compensated differential transistor amplifiers are described. One compensating circuit involves a diode having a parallel biasing resistor to give it a voltage-drop and temperature-coefficient like the transistor base-emitter voltage, to maintain its upper terminal at the base potential. A second involves a diode having a voltage-drop temperature-coefficient of equal magnitude and opposite polarity to the base current gain, with a parallel potentiometer having a tap connected through a resistor to the base so that the base current flow is proportional to the voltage-drop across the diode. A third involves two diodes having variations in voltage-drop with temperature equal in magnitude and opposite in polarity to the $\Delta V_{be}$ of a differential transistor pair. The diodes are connected in series between current sources with a potentiometer in parallel with the diodes having a tap from which a resistor is connected to the emitter circuit of the differential pair, which contains an emitter resistor connected between the emitters, so that the voltage selected by the tap provides a voltage-drop across the emitter resistor equal and opposite to $\Delta V_{be}$.

Figures 1, 2:
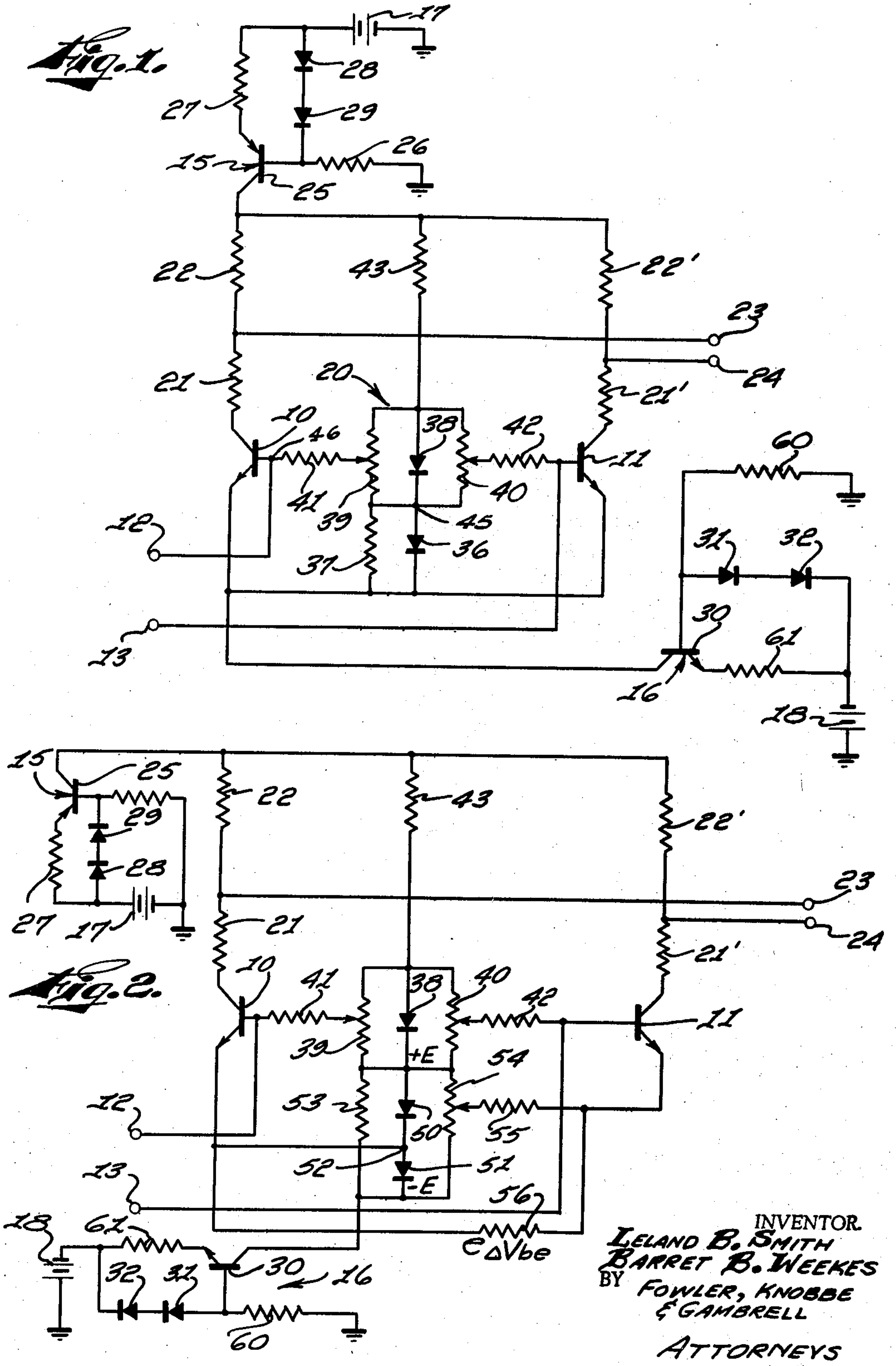

The present invention relates to the temperature compensated transistor amplifiers and in particular to means for compensating for the effects of base current variations due to temperature variations in the base current gain parameter $\beta$ and the effects of mismatched thermal coefficients of the base-emitter voltage parameter $V_{be}$. Although of general application, the compensation circuits described hereinafter are especially advantageous in low level, floating input differential amplifiers.

The temperature variations in the transistor parameters $\beta$ and $V_{be}$ have been previously described, see, for example, the papers entitled "A Transistor Temperature Analysis and its Application to Differential Amplifiers" by Werner Steiger, published in the IRE "Transactions on Instrumentation," vol. 1–8, No. 3, December 1959, and "Correlation between the Base Emitter Voltage and its Temperature Coefficient" by Alfons Tuszynski published in Solid State Design, vol. 3, pages 32–35, July 1962. The base current gain $\beta$ has a positive temperature coefficient of the order of 0.8% per ° C. for silicon planar transistors. The value of $V_{be}$ is of the order of 500 millivolts and a representative mismatch in this particular parameter in differential amplifiers is 10 millivolts. The temperature coefficient $\Delta V_{be}$ is to a high degree of accuracy proportional to the initial $\Delta V_{be}$ and is of the order of 50 microvolts per °C. for a magnitude of $\Delta V_{be}$ of 10 millivolts. Drift resulting from these temperature variable parameters has heretofore been a major limitation in the design of low-level transistor direct coupled amplifiers.

Accordingly, it is the principal object of this invention to provide compensation for the temperature variable parameters $\beta$ and $V_{be}$.

In brief, a preferred embodiment of this invention comprises an amplifier stage having a compensation circuit including a first diode selected to have a temperature coefficient approximately equal to and opposite in polarity to the temperature coefficient of the transistor parameter $\beta$. A voltage is established across this diode, which voltage is used to supply substantially all of the base current in the transistor amplifier. This base current will vary according to the temperature variation of the diode and thus varies according to the temperature variation in $\beta$, thereby preventing drift caused by variations in $\beta$ with temperature. The compensation circuit further includes another diode having a voltage drop equivalent to the parameter $V_{be}$ and selected to have a temperature coefficient approximately equivalent to the magnitude and polarity of the temperature coefficient of the parameter $V_{be}$. One electrode of the $\beta$ compensation diode is coupled to this second diode so that this electrode is maintained at the base potential of the amplifier transistor. The base current is thereby independent of both the parameter $V_{be}$ and the changes in $V_{be}$ with temperature.

A modified compensation circuit described hereinafter generates a voltage equal to and opposite in sign to the difference in value between the parameters $V_{be}$ of a differential amplifier transistor pair ($\Delta V_{be}$) and substantially proportional to the temperature coefficient of $\Delta V_{be}$, thereby compensating for mismatched temperature coefficients of the $V_{be}$ parameter.

A more thorough understanding of the invention may be obtained by a study of the following detailed description taken in connection with the accompanying drawings in which:

FIG. 1 is a schematic circuit of a differential amplifier incorporating circuitry constructed in accordance with the present invention which compensates for base current variations due to temperature variations of the base current gain parameter $\beta$ and FIG. 2 is a modification of the circuit of FIG. 1 having additional circuitry for compensating for mismatched base-emitter voltage parameters of the differential amplifier transistors.

In these figures, like numerals denote like elements.

Referring now to FIG. 1, NPN transistors 10, 11 are connected as a common emitter differential amplifier stage having a first input terminal 12 coupled to the base of transistor 10 and a second input terminal 13 connected to the base of transistor 11. Both of these terminals can float with respect to ground since the emitter current for transistors 10, 11 is supplied by respective constant current sources 15, 16 connected to respective positive and negative voltage sources 17, 18.

The quiescent operating state of the amplifier is determined by the base current supplied by compensation circuit 20 and by the respective collector electrode resistors 21, 22 and 21', 22'. The amplifier output terminals 23, 24 are connected to the common junctions of these resistances as shown.

The constant current sources 15, 16 advantageously comprise an active current source provided by a common-base transistor circuit. Thus, the positively biased source 15 comprises a P-N-P transistor 25 having its base connected to ground through resistor 26 and its emitter connected to positive source 17 via bias resistor 27. Series coupled diodes 28, 29 are connected between the base and the node between resistor 27 and source 17. These diodes provide a first order compensation for the temperature coefficient of the base-emitter voltage of transistor 25 and further provide a low impedance reference voltage source for the base. Current source 16 is substantially similar, transistor 30 and diodes 31, 32 thereof being oppositely polled to operate from the negative voltage source 18. Both current sources 15, 16 provide, as is well known in the art, substantially constant output collector currents in their active regions, having a value determined by the emitter resistance and being substantially independent of the voltage between the transistor collector and base.

Compensation circuit 20 compensates for base current variations in the differential amplifier transistors 10, 11 due to variations in base current gain ($\beta$) with temperature and comprises diode 36 biased by parallel coupled resistor 37 and diode 38 in parallel with respective voltage dividers 39, 40. The divider outputs are respectively connected to the base electrodes of transistors 10, 11 by resistors 41, 42. Diodes 36, 38 are connected in series with resistor 43 between the positively biased constant current source 15 and the negatively biased constant current source 16.

The operation of compensation circuit 20 is as follows: The magnitude of resistor 37 is selected so that the voltage drop across diode 36 matches the DC emitter-to-base voltage of transistors 10, 11. This diode is also selected so that its voltage drop temperature characteristic is approximately equivalent in magnitude and polarity to the temperature coefficient of $V_{be}$; accordingly, node 45 is then maintained at approximately the same potential as the transistor base electrode, i.e. the voltage between base electrode 46 and node 45 is maintained at approximately zero voltage. Diode 38 is so selected that its voltage drop temperature coefficient is approximately equal to and opposite in polarity to the temperature coefficient of the current gain parameter $\beta$ of transistors 10, 11. By way of example, silicon planar transistors have a base-emitter voltage $V_{be}$ of the order of 500 mv. and a negative temperature coefficient of the order of 2.5 mv. per °C. These parameters are essentially matched by silicon diodes which may be biased to have a matching voltage drop of 500 mv. and a negative temperature coefficient of the order of 2.5 mv. per °C. Further, silicon planar transistors exhibit a positive temperature coefficient of the order of 0.8 percent per °C. A germanium diode is then conveniently selected as the $\beta$ compensating diode 38, this diode type having a negative temperature coefficient of the order of 1.0 percent per °C.

Voltage dividers 39, 40 each comprise resistance having an adjustable intermediate point of connection so as to provide a means for selecting a predetermined portion of the voltage drop across diode 38 for independently regulating the base current of each of the transistors 10, 11. Resistors 41, 42 are substantially larger in magnitude than the voltage divider resistors and therefore act as current sources. Proper adjustment of the voltage divider 39, 40 enables equalization of the base current in the transistors 10, 11 which currents will track the temperature variations of the base current gain parameter $\beta$. By placing the cathode of diode 38 at the transistor base potential, the base current is substantially entirely determined by the voltage across diode 38 so that by properly selecting the temperature coefficient of this element to match that of the transistor $\beta$ parameter, base current variations caused by variations with temperature can be substantially compensated for. Amplifiers so constructed have therefore minimal thermal drift caused by variations of $\beta$ with temperature.

A modification of the circuit of FIG. 1 providing compensation for differences between the $V_{be}$ parameter of transistors 10, 11 is shown in FIG. 2. A pair of diodes 50, 51 are connected in series with diode 38 and resistance 43 between the current sources 15, 16, with the cathode of diode 50 being connected to the anode of diode 51 and the common node 52 being connected to the emitter of transistor 10. Diode 50 therefore corresponds to diode 36 of FIG. 1 and is selected so that its voltage drop approximately matches the transistor $V_{be}$ voltage and temperature coefficient for thereby maintaining the cathode of diode 38 at approximately the transistors base potential. The diode pair 50, 51 have respective voltage drops established thereacross by current sources 15, 16. The magnitude of these voltage drops are determined by shunt resistance 53. Therefore, diodes 50, 51 respectively establish a positive voltage source (+E) and a negative voltage source (−E) measured with respect to node 52. Voltage divider 54, comprising a resistor having an adjustable intermediate point of connection, is connected in shunt with diodes 50, 51 and permits selection of any voltage between +E and −E. Resistor 55 coupled to the voltage divider output acts as a current source for causing a voltage drop across resistance 56. This latter resistance has a substantially smaller value than resistor 55 so that the voltage drop thereacross is that portion of +E or −E selected by the movable intermediate connection of resistance 54 divided by a predetermined value corresponding to the ratio of resistors 55 to 56.

The operation of the $\Delta V_{be}$ compensation circuit of FIG. 2 is as follows: Each transistor 10, 11 has a particular base-emitter voltage ($V_{be}$) associated therewith at a given temperature. The difference between $V_{be}$ of transistor 10 and transistor 11 or $\Delta V_{be}$ is compensated for by the setting of voltage divider 54 so that the voltage drop across resistor 56 is equal in magnitude and opposite in sign to the value $\Delta V_{be}$ of either transistor may be larger in magnitude than the other, i.e. the polarity of $\Delta V_{be}$ may be either positive or negative, since the voltage output of divider 54 may be varied between the positive and negative voltages +E and −E so as to provide either polarity voltage drops across resistor 56.

Diodes 50, 51 are so selected that their percentage change of voltage drop with temperature is substantially equal in magnitude and opposite in sign to that of $\Delta V_{be}$ temperature coefficient. As noted hereinabove, the drift of $\Delta V_{be}$ with temperature is proportional to the initial value of $\Delta V_{be}$. Therefore, if the temperature coefficient of the voltage drops across diodes 50, 51 is equal and opposite in sign to the $\Delta V_{be}$ temperature coefficient when the voltage divider 54 is set to its maximum unbalance condition (+E or −E) to provide a maximum correction voltage $e_{\Delta V_{be}}$, then the correction voltage $e_{\Delta V_{be}}$ will have a temperature coefficient proportional to any magnitude of $\Delta V_{be}$ so long as $\Delta V_{be}$ does not exceed the maximum correction voltage provided by maximum unbalance of the divider.

By way of further explanation of the operation of this portion of the circuitry, assume, by way of specific example, that each diode has a 500 mv. drop established by current sources 15, 16 and resistor 53 so that the value of +E is 500 mv. and of −E is 500 mv. The respective values of resistance 55 and 56 may be 5000 and 100 ohms respectively so that the voltage selected by the movable connection point of divider 54 is divided by the factor 50. The maximum and minimum values established for the voltage drop across resistor 56 ($e_{\Delta V_{be}}$) are then ±10 mv. The temperature coefficient of the compensation voltage $e_{\Delta V_{be}}$ will be also that of the diode voltage drop divided by the factor 50. As heretofore noted, a representative temperature coefficient for silicon diodes is −2.5 mv. per °C. or a percent change of −0.5 percent per °C.; accordingly, the temperature coefficient of $e_{\Delta V_{be}}$ will be −50 per °C., which corresponds in magnitude to the measured temperature coefficient of $\Delta V_{be}$. If the temperature coefficient of $e_{\Delta V_{be}}$ is equal and opposite to the $\Delta V_{be}$ temperature coefficient with maximum unbalance set by divider 54, the compensating voltage $e_{\Delta V_{be}}$ will have a temperature coefficient proportional to any smaller value of $\Delta V_{be}$ which is compensated for by a setting of divider 54 intermediate the values +E and −E because of the proportionality existing between the value of the temperature coefficient of $\Delta V_{be}$ and the initial value of $\Delta V_{be}$.

The percentage that the voltage across diodes 50, 51 changes with temperature can be varied to more closely match the $\Delta V_{be}$ temperature coefficient by varying the current flow through the diodes through control of the sources 15, 16 and bias resistor 53. Thus, for silicon diodes, the diode current flow may be increased to obtain a voltage drop of 600 mv., the diode temperature coefficient then being of the order of 2.0 mv. per °C. or a percent change of 0.33 percent per °C.; or the diode current flow may be decreased to obtain a voltage drop of 450 mv., the diode temperature coefficient then being of the order of 3.0 mv. per °C. or a percent change of 0.66 percent per °C. In this manner, the compensation value may be tailored to match a specific temperature coefficient of $\Delta V_{be}$, thus affording a very accurate compensation of this parameter.

By way of example only, the following specific components may be employed in the temperature compensated amplifier of FIG. 2.

| | |
|---|---|
| Transistors **10**, **11** | 2N2453 |
| Voltage sources **17**, **18** ——volts | 18 |
| Resistors **21**, **21′** | 5.1K Ω |
| Resistors **22**, **22′** | 121K Ω |
| Transistor **25** | 2N2905 |
| Resistors **26**, **60** | 6.2K Ω |
| Resistors **27**, **61** | 390 Ω |
| Diodes **28**, **29**, **31**, **32**, **50**, **51** | 1N645 |
| Transistor **30** | 2N2219 |
| Diode **38** | 1N770 |
| Voltage divider resistors **39**, **40** | 5K Ω |
| Resistors **41**, **42** | 510K Ω |
| Resistor **43** | 1.5K Ω |
| Resistor **53** | 1.6K Ω |
| Voltage Divider Resistor **54** | 5K Ω |
| Resistor **55** | 5.11K Ω |
| Resistor **56** | 100 Ω |

Although exemplary embodiments of the invention have been disclosed and discussed, it will be understood that other applications of the invention are possible and that the embodiments disclosed may be subjected to various changes, modifications, and substitutions without necessarily departing from the spirit of the invention.

We claim:

1. A differential amplifier having compensation for base current variations caused by temperature variations of the transistor base current amplification parameter $\beta$, and compensation for a differential base-emitter voltage $\Delta V_{be}$ comprising positive and negative constant current sources;

first and second transistors connected as a floating input, common emitter differential amplifier and being supplied with emitter current from said positive and negative current sources;

a first diode whose voltage drop temperature coefficient is approximately equivalent in magnitude and opposite in polarity to the base current gain of said transistors;

second and third diodes whose percentage change of voltage drop with temperature is approximately equivalent in magnitude and opposite in polarity to the $\Delta V_{be}$ temperature coefficient;

means connecting said first, second and third diodes between said constant current sources;

a biasing resistance in parallel with said second and third diodes and having a value such that the voltage drop and temperature coefficient of one of said diodes substantially equals the base-emitter transistor voltage so that one electrode of said first diode is maintained at practically the base potential of said transistors;

first and second resistors each having an adjustable intermediate point of connection, said resistors being connected in parallel with said first diode;

resistive means respectively connected between said intermedite points of connection and the base electrodes of said first and second transistors so that their base current flow is proportional to the voltage drop across said first diode;

a third resistor having an adjustable intermediate point of connection connected in parallel with said second and third diodes;

a resistance connected between the emitter electrodes of said transistors; and resistive means respectively connected between the intermediate point of connection of said third resistance and said emitter coupling resistor for providing a voltage drop across said emitter coupling resistor substantially equivalent in magnitude and opposite in polarity to $\Delta V_{be}$.

2. The differential amplifier of claim 1 wherein said first and second transistors are of the silicon planar type, said first diode is of the germanium type, and said second and third diodes are of the silicon type.

3. A differential transistor amplifier having compensation for base current variations caused by temperature variations of the transistor base current amplification parameter comprising positive and negative constant current sources, first and second transistors connected as a floating input, common emitter differential amplifier coupled and being supplied with emitter constant current from said positive and negative current sources;

a first diode whose voltage drop temperature coefficient is approximately equivalent in magnitude and opposite in polarity to the base current gain of said transistors;

a second diode whose temperature coefficient is approximately equivalent in magnitude and opposite in polarity to the base-emitter voltage parameter $V_{be}$ of said transistors;

means connecting said first and second diodes in series between said constant current sources;

a biasing resistance in parallel with said second diode and having a value such that the voltage drop and temperature coefficient of said second diode substantially equals the base-emitter transistor voltage so that one electrode of said first diode is maintained at approximately the base potential of said transistors;

first and second resistors each having an adjustable intermediate point of connection, said resistors being connected in parallel with said first diode, and resistive means respectively connected between said intermediate points of connection and the base electrodes of said first and second transistors so that their base current flow is proportional to the voltage drop across said first diode.

4. A differential amplifier having compensation for differential base-emitter voltages $\Delta B_{be}$ due to temperature variations comprising positive and negative emitter current sources;

first and second transistors connected as a floating input, common emitter differential amplifier coupled between said positive and negative emitter current sources;

first and second diodes whose percentage change of voltage drop with temperature is approximately equivalent in magnitude and opposite in polarity to the $\Delta V_{be}$ temperature coefficient;

means connecting said diodes in series between said contant current sources;

a first resistor having an adjustable intermediate point of connection, said resistor being connected in parallel with said diodes;

a second resistor connected between the emitter electrodes of said transistors;

and a third resistor connected between said intermediate point of connection and said second resistor so that the voltage selected by said intermediate terminal provides a current flow through and a resultant voltage drop across said third resistor, which voltage drop is selected equal in magnitude and opposite in polarity to $\Delta V_{be}$.

References Cited

UNITED STATES PATENTS

| | | | |
|---|---|---|---|
| 3,025,414 | 3/1962 | McVey | 330—30 |
| 3,109,971 | 11/1963 | Welch et al. | 330—24 |
| 3,168,708 | 2/1965 | Stuart-Williams et al. | 330—30 |
| 3,171,037 | 2/1965 | Poppelbaum et al. | 330—30 |
| 3,206,619 | 9/1965 | Lin | 330—24 |

NATHAN KAUFMAN, Primray Examiner

U.S. Cl. X.R.

330—24, 30